(12) United States Patent
Yasumi et al.

(10) Patent No.: US 6,953,250 B2
(45) Date of Patent: Oct. 11, 2005

(54) COLOR ADJUSTING METHOD FOR PROJECTOR

(75) Inventors: Takehiko Yasumi, Tokyo (JP); Kazuo Mochizuki, Tokyo (JP); Hisakazu Aoyanagi, Tokyo (JP); Michitaka Naitou, Tokyo (JP); Shigenobu Jyou, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 28 days.

(21) Appl. No.: 10/616,948

(22) Filed: Jul. 11, 2003

(65) Prior Publication Data

US 2004/0017550 A1 Jan. 29, 2004

(30) Foreign Application Priority Data

Jul. 23, 2002 (JP) ........................................ 2002-214597

(51) Int. Cl.⁷ .................... G03B 21/00; G03B 21/14; H04N 17/00; H04N 17/02; G06K 9/00
(52) U.S. Cl. ........................ 353/31; 353/69; 348/179; 382/167; 382/164; 382/165; 345/593
(58) Field of Search ............................. 353/31, 34, 69; 348/177, 179; 382/162, 167, 164–165; 345/589, 592, 593

(56) References Cited

U.S. PATENT DOCUMENTS

| 4,106,846 A | | 8/1978 | Russin | |
|---|---|---|---|---|
| 5,638,117 A | | 6/1997 | Engeldrum et al. | |
| 5,670,985 A | | 9/1997 | Cappels, Sr. et al. | |
| 6,439,722 B1 | * | 8/2002 | Seegers et al. | 351/243 |
| 2001/0003543 A1 | * | 6/2001 | Kagawa et al. | 382/162 |
| 2003/0227577 A1 | * | 12/2003 | Allen et al. | 348/742 |
| 2004/0140982 A1 | * | 7/2004 | Pate | 345/600 |

* cited by examiner

*Primary Examiner*—Rodney Fuller
*Assistant Examiner*—Magda Cruz
(74) *Attorney, Agent, or Firm*—Sughrue Mion, PLLC

(57) ABSTRACT

A first area and a second are formed in an image projected by a projector. A standard image plate is placed in a surface on which an image for the first area is projected. A standard image has been drawn on a standard image plate and is displayed in correct colors when white light is projected on the standard image plate. The projector projects white light as the image for the first area. An image for the second area is projected on a projecting surface. A user operates an operating section so that the image in the second area is closer to the standard image. A color correcting section corrects the colors of the image in the second area on the basis of information inputted to the operating section.

18 Claims, 14 Drawing Sheets

COLOR ADJUSTING METHOD FOR PROJECTOR

BACKGROUND OF THE INVENTION

1. Field of the Invention

The present invention relates to a color adjusting method for a projector, and in particular, to a color adjusting method used if the color of a screen or wall used as an image projecting surface is different from white, to adjust properly the colors of an image displayed on the projecting surface.

2. Description of the Related Prior Art

An image projected by a projector such as a liquid crystal projector is displayed on a projecting surface. The projecting surface is generally composed of a screen or a wall. Such a screen or wall is not necessarily white. Even if it is white when it starts to be used, it may become yellowish or bluish later. The image projected on such a screen or wall is displayed in colors relatively different from actual ones. Consequently, a user does not see the displayed image in its original colors. To allow the user to see the image in its original colors, the colors of the projected image must be adjusted.

FIG. 1 is a view showing a conventional color adjusting method. A projector 10 projects an image on a screen 20. A user M observes a displayed image 30 on the screen 20. On the basis of the results of the observation, the user adjusts colors by operating the projector 10.

FIG. 2 is a block diagram showing a configuration of the projector 10. The projector 10 includes an operating section 11, a color correction processing section 12, an output signal processing section 13, and a video output section 14. The operating section 11 includes key switches and the like and is operated on the basis of the user M's determinations. On the basis of the user M's operation of the operating section 11, the color correction processing section 12 generates correction data d used to correct an externally supplied video signal in. The output signal processing section 13 adds the correction data d to the video signal into generate a color-adjusted video signal P. The video output section 14 is, for example, a three-plate type liquid crystal projector unit that splits white light generated by a light source into primary lights in red, green, and blue. The video output section 14 then modulates the primary lights in accordance with the video signal P. Subsequently, the video output section 14 carries out additive color mixture and then projects the mixed light on the screen 20.

With the color adjusting method used for the projector 10, if the color of the screen 20 is different from white, the user M first observes the color of the displayed image 30. On the basis of the results of the observation, the user operates the operating section 11 to carry out white balance adjustment, color temperature adjustment, and color corrections (adjustment of luminance, hue, or saturation) so that the image assumes desired colors.

However, with this conventional color adjusting method, the user M observes the colors of the projected image 30 and subjectively adjusts them on the basis of the results of the observation. Thus, the colors are adjusted without using any accurate references. Therefore, the user M disadvantageously cannot adjust the colors accurately.

SUMMARY OF THE INVENTION

It is an object of the present invention to provide a color adjusting method of allowing a user to adjust easily colors so as to display them optimally on a screen or wall the color of which is different from white.

According to a first embodiment of the present invention, there is provided a color adjusting method used for a projector to correct colors of an image on a projecting surface, the image being projected by the projector, the method comprising the steps of: (1) placing a standard image plate in a first area of the projecting surface, (2) projecting white light on the standard image plate, (3) projecting an image on a second area of the projecting surface, and (4) correcting colors of the image in the second area so that the colors are closer to colors of the standard image plate.

According to a second embodiment of the present invention, there is provided a color adjusting method used for a projector to correct colors of an image on a projecting surface, the image being projected by the projector, the method comprising the steps of: (1) placing a white plate in a first area of the projecting surface, (2) projecting a standard image on the white plate, (3) projecting an image on a second area of the projecting surface, and (4) correcting colors of the image in the second area so that the colors are closer to colors of the standard image.

According to a embodiment of the present invention, there is provided a projector that projects an image on a projecting surface, the projector comprising an image dividing section that forms a first area and a second area in an image to be projected, a video output section that projects, as an image for the first area, white light on a standard image plate on which a standard image has been drawn, while projecting an image for the second area on the projecting surface, an operating section operated by a user, and a color correcting section that corrects the image in the second area on the basis of information inputted to the operating section.

According to a second embodiment of the present invention, there is provided a projector that projects an image on a projecting surface, the projector comprising an image dividing section that forms a first area and a second area in an image to be projected, a video output section that projects a standard image on a white plate as an image for the first area, while projecting an image for the second area on the projecting surface, an operating section operated by a user, and a color correcting section that corrects the image in the second area on the basis of information inputted to the operating section.

BRIEF DESCRIPTION OF THE DRAWINGS

The above and other objects, features, and advantages of the present invention will become apparent from the following detailed description when taken with the accompanying drawings in which.

DETAILED DESCRIPTION OF THE PREFERRED EMBODIMENTS

Figure 1:
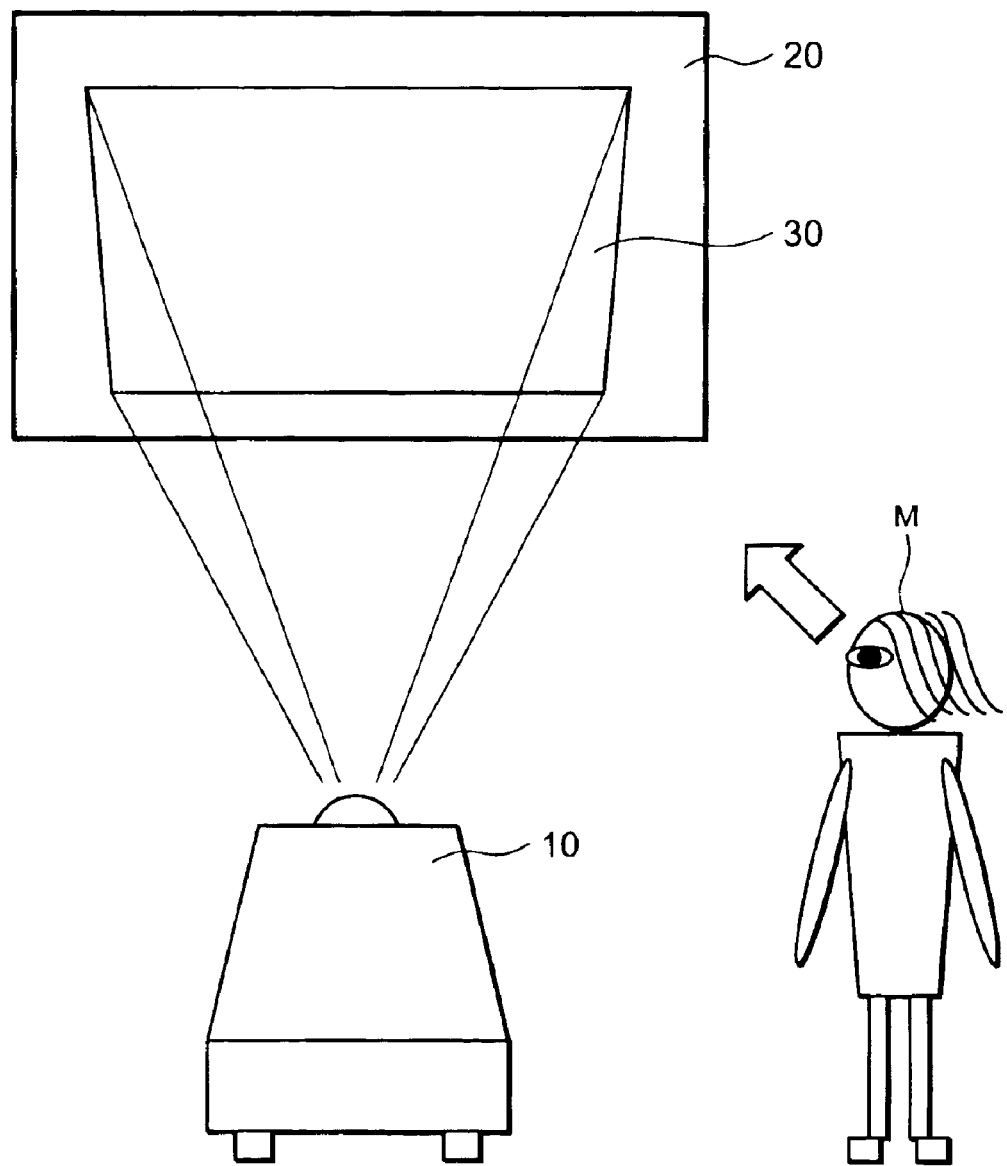
FIG. 1 is a view showing a conventional color adjusting method.
Figure 2:
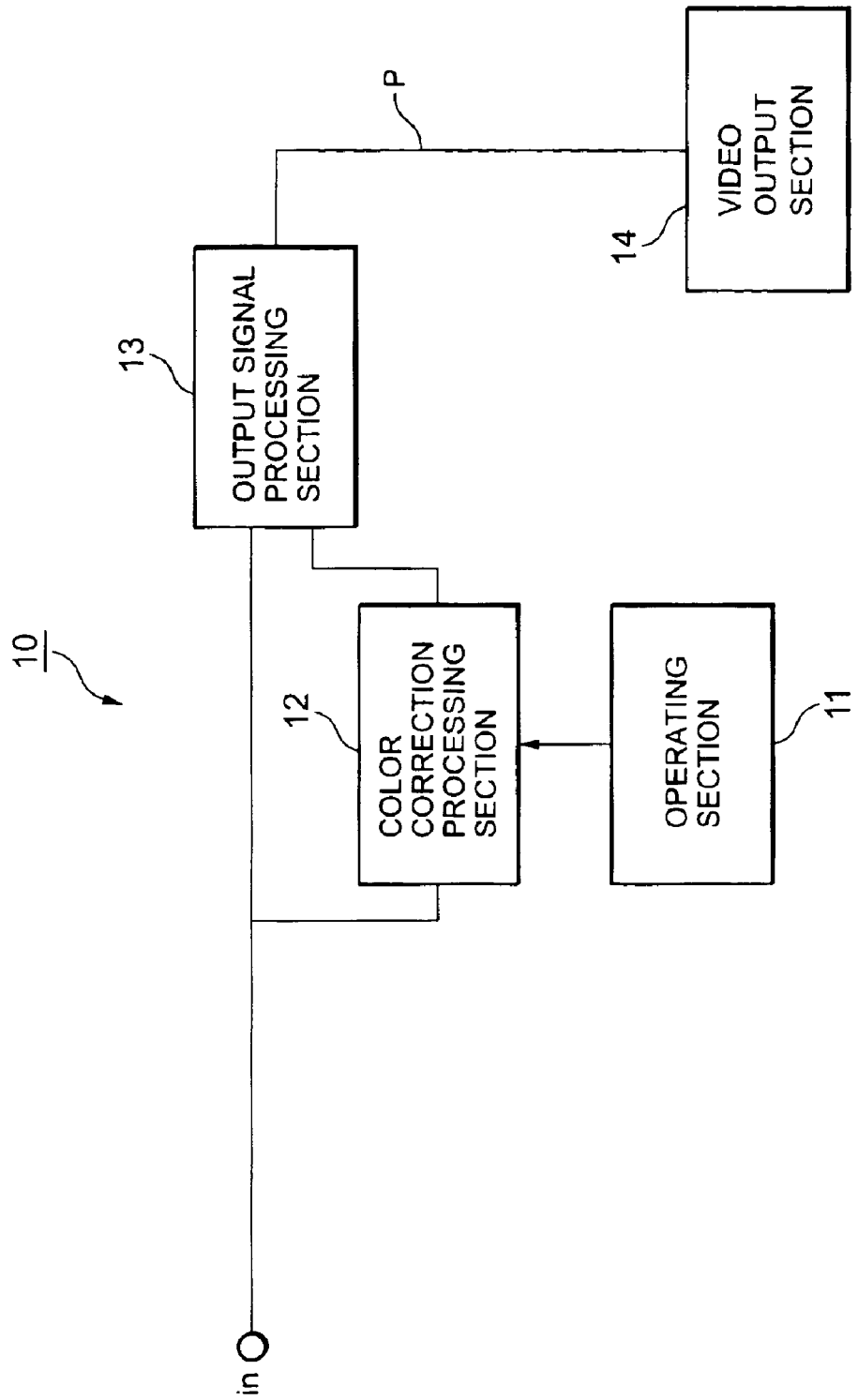
FIG. 2 is a block diagram showing a configuration of a conventional projector.
Figure 3:
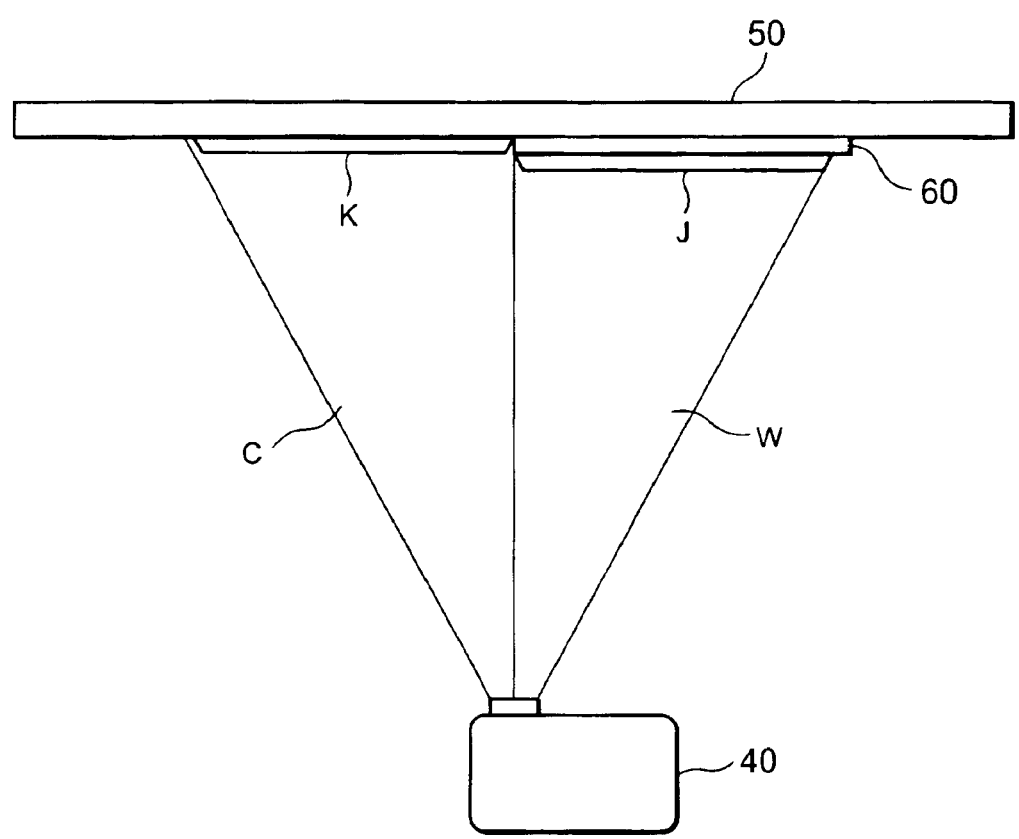
FIG. 3 is a schematic view showing a first embodiment of the present invention.

FIG. 3 is a schematic view showing a first embodiment of the present invention. The first embodiment includes a projector 40, a screen 50, and a standard image plate 60. The projector 40 projects an image corresponding to an inputted video signal, on the screen 50. In the present embodiment, the projector 40 divides a display area of the screen 50 into two vertically or horizontally arranged areas. White light is projected in one J of the two areas. An image is projected in the other area K.

The screen 50, which was white when it started to be used, has become yellowish or bluish owing to secular changes. The standard image plate 60 is installed in an area J of the screen 50. A standard image is drawn on the standard image plate 60 and is displayed in its correct colors when the projector 40 projects white light on it through a standard white area W. The standard image contain all of, for example, white, red, green, blue, and a memory color (for example, flesh color, plant green, or sky blue). The projector 40 projects a corrected image in the area K of the screen 50 through a corrected image projecting area C, the corrected image having the same pattern as that of the standard image drawn on the standard image plate 60. The user observes the standard image on the area J and the corrected image on the area K of the screen 50. On the basis of the results of the observation, the user operates the projector 40 so that the corrected image has the same colors as those of the standard image.

Figure 4:
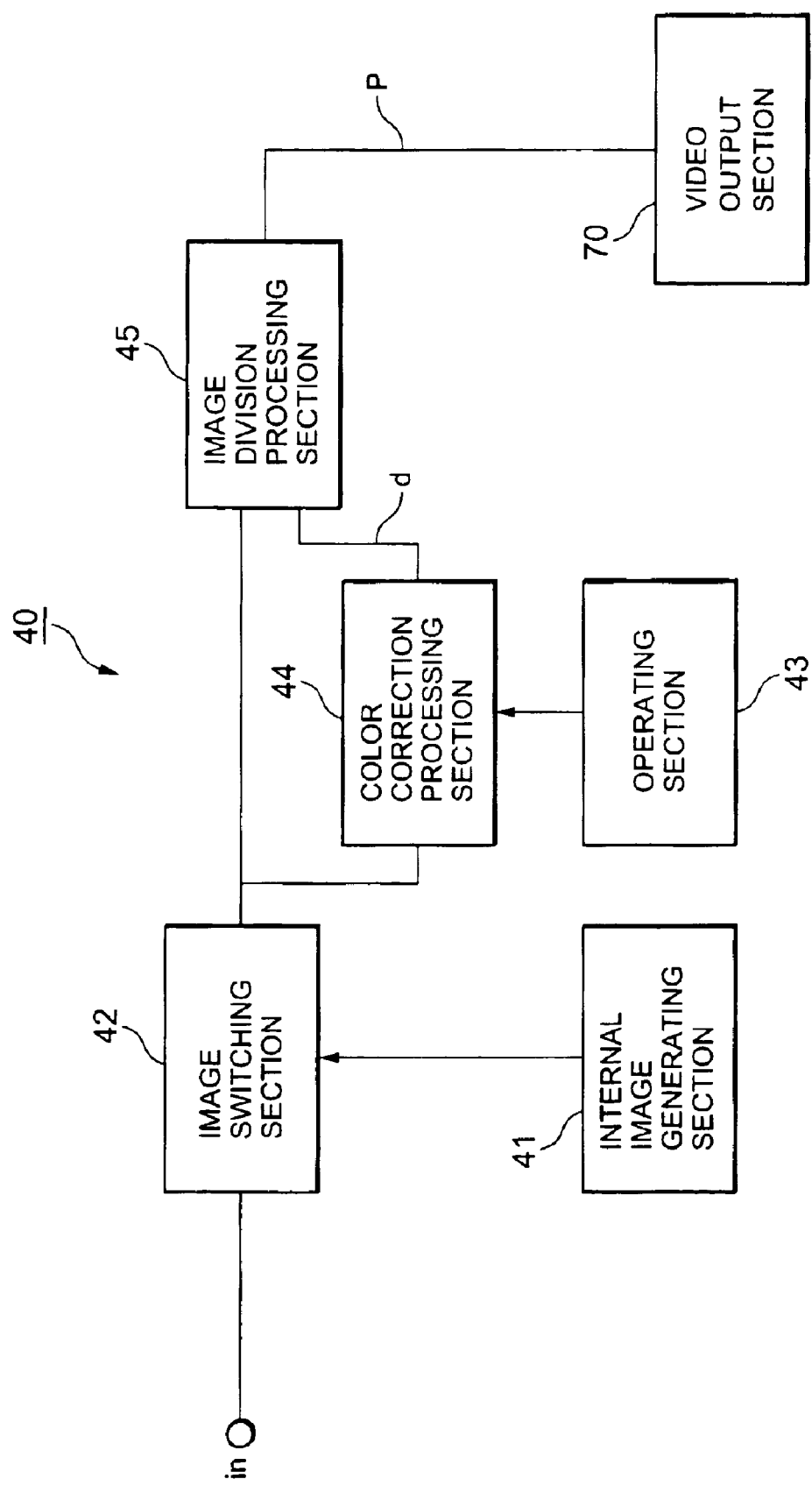
FIG. 4 is a block diagram showing a configuration of a projector according to the first embodiment of the present invention.

FIG. 4 is a block diagram showing a configuration of the projector 40. The projector 40 includes an internal image generating section 41, an image switching section 42, an operating section 43, a color correction processing section 44, an image division processing section 45, and a video output section 70. The internal image generating section 41 holds, as an internal image, a corrected image projected in the area K of the screen 50. In particular, in the present embodiment, the internal image generating section 41 generates a corrected image having the same pattern as that of the standard image drawn on the standard image plate 60. The image switching section 42 selectively switches between the image held by the internal image generating section 41 as an internal image and a video signal in corresponding to the user's favorite image, on the basis of the user's operation. The operating section 43 includes key switches and the like and is operated on the basis of the user's determinations.

The color correction processing section 44 generates correction data d on the basis of an operation performed on the operating section 43 by the user, the correction data d being used to correct the image selected by the internal image generating section 41. The image division processing section 45 adds the correction data d to the image selected by the image switching section 42, to generate a color-adjusted corrected image and thus a video signal P. The video signal P divides the display area of the screen 50 into the two horizontally arranged are as J and K. The video signal P projects the corrected image in the area K, while projecting white light in the area J (standard image plate 60). The video output section 70 includes a three-plate type liquid crystal projector unit, for example. The video output section 70 splits white light generated by a light source into primary lights in red, green, and blue. The video output section 70 then modulates each primary light in accordance with the video signal P outputted by the screen division processing section 45. The video output section 70 finally executes additive color mixture to mix the lights and projects the mixed light on the screen 20.

Figure 5:
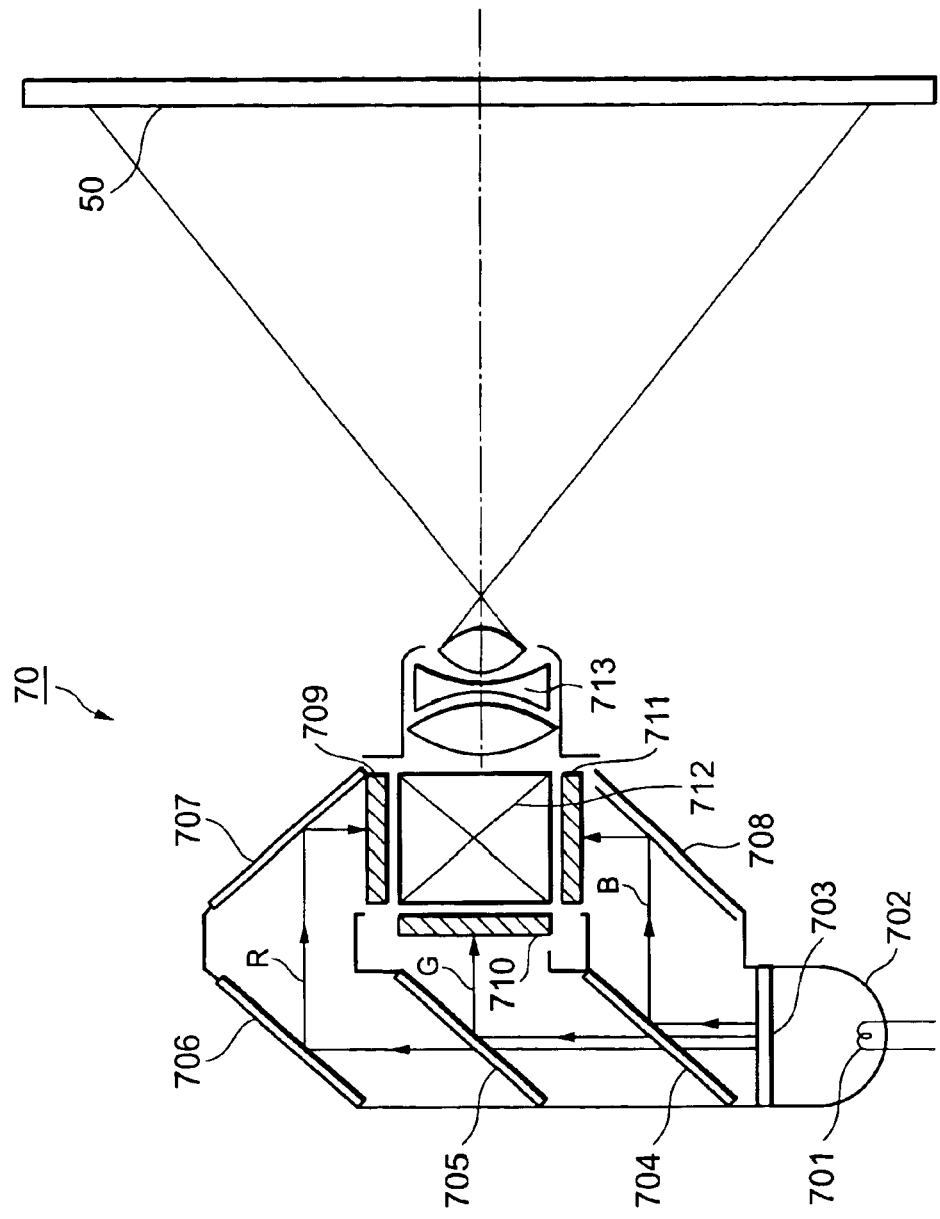
FIG. 5 is a view showing a configuration of an example of a video output section.

FIG. 5 is a view showing an example of a configuration of the video output section 70. The video output section 70 is a three-plate type liquid crystal projector unit including a lamp 701, a reflector 702, an interference filter 703, dichroic mirrors 704 and 705, mirrors 706, 707, and 708, liquid crystal light valves 709, 710, and 711, a dichroic prism 712, and a projection lens 713.

The video output section 70 uses the dichroic mirrors 704 and 705 to split white light generated by the lamp 701 into primary lights in red, green, and blue. The video output section 70 then modulates each primary light in accordance with the video signal P (the light is transmitted or blocked by the liquid crystal light valves 709, 710, and 711). Then, the dichroic prism 712 mixes the lights and the projection lens 713 projects the mixed light on the screen 50.

Figure 6:
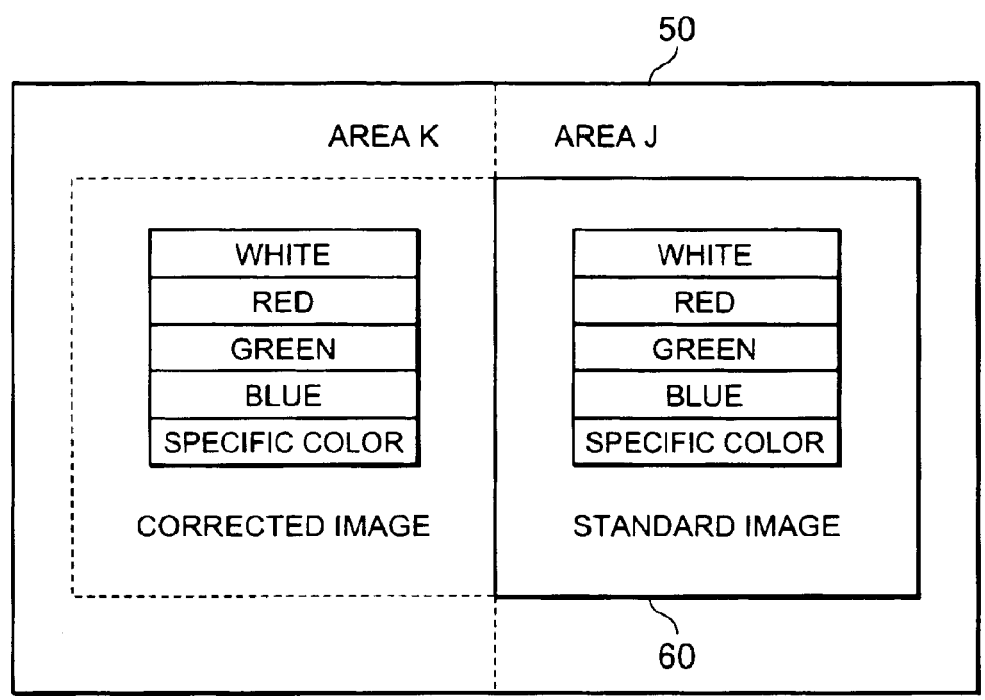
FIG. 6 is a view showing an example of a standard image on a standard image plate and a corrected image on an area K of a screen.
Figure 7:
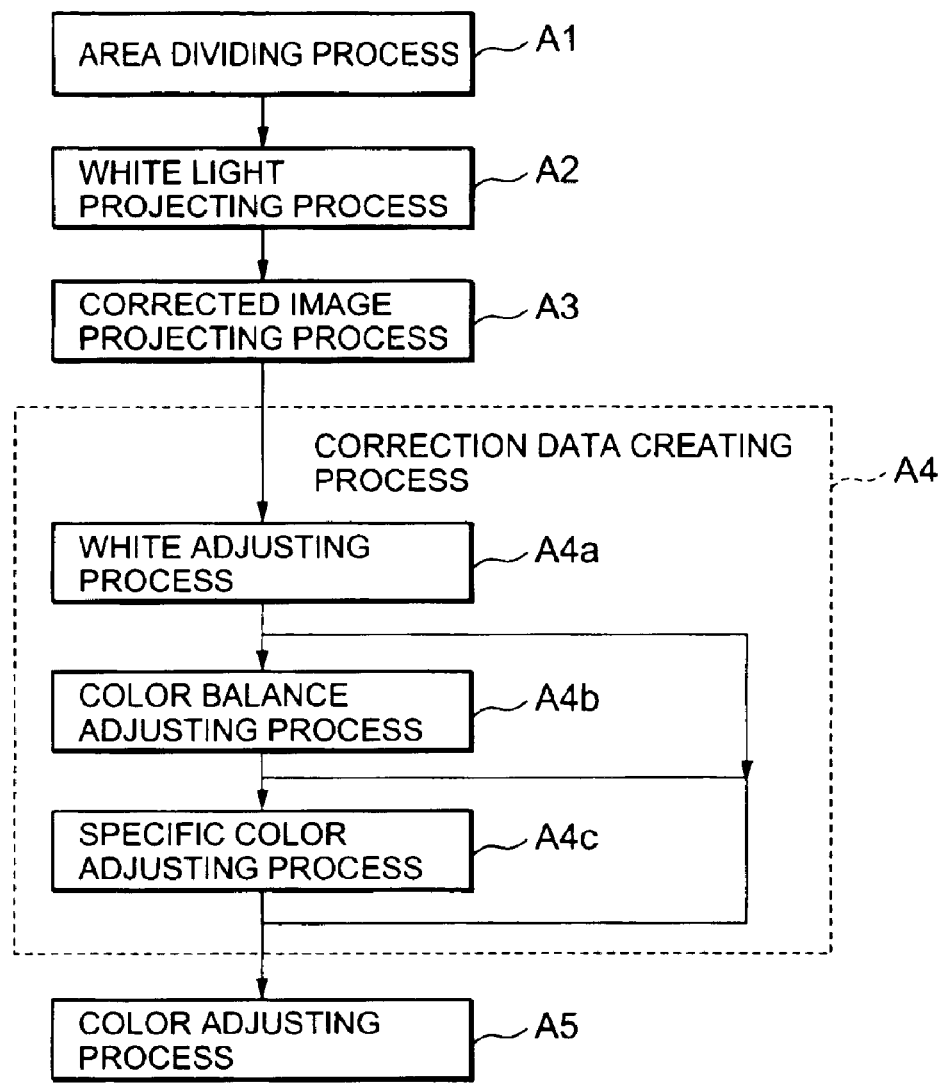
FIG. 7 is a flowchart illustrating a color adjusting method according to the first embodiment.

FIG. 6 is a view showing an example of the standard image on the standard image plate 60 and the corrected image in the area K of the screen 50. FIG. 7 is a flow chart illustrating a color adjusting method used for the projector 40. With reference to FIGS. 6 and 7, description will be given of the contents of processing executed in the color adjusting method used in the present embodiment.

As shown in FIG. 6, the image division processing section 45 divides the display area of the screen 50 into two horizontally arranged areas J and K (step A1, area dividing process). The standard image plate 60 is installed on the area J of the screen 50. The video output section 70 projects white light on the standard image plate 60 (step A2, white light projecting process) Further, the video output section 70 projects a corrected image on the area K of the screen 50, the corrected image having the same pattern as that of the standard image drawn on the standard image plate 60 (step A3, corrected image projecting process)

The user compares the two images and operates the operating section 43 so that the corrected image on the area K is closer to the standard image on the standard image plate 60. In response to an input from the operating section 43, the color correction processing section 44 creates correction data d to correct the video signal in (step A4, corrected data creating process). This corrected data creating process (step A4) comprises at least one of a white adjusting process (step A4a), a color balance adjusting process (step A4b), and a specific color adjusting process (step A4c).

The white adjusting process (step A4a) comprises paying attention to white parts of the corrected and standard images to make adjustment so that the luminance of the white part of the corrected image is closer to that of the standard image. The color balance adjusting process (step A4b) comprises paying attention to the color balance of the entire corrected and standard images to make adjustment so that the color balance of the corrected image is closer to that of the standard image. In this case, at least one of the luminance, hue, and saturation of red, green, and blue in the corrected image is adjusted. The specific color adjusting process (step A4c) comprises paying attention to a specific color (for example, a memory color such as flesh color or sky blue) part of each of the corrected and standard images to make adjustment so that the color of the specific color part of the corrected image is closer to that of the standard image. The color correction processing section 44 adds the correction data d to the video signal in to adjust the colors of the corrected image displayed on the screen 50 (step A5, color adjusting process). Subsequently, the screen division processing section 45 clears the division of the display area of the screen 50. The video output section 70 displays, on the screen 50, an image obtained by adjusting the color of the video signal in.

As described above, in the first embodiment, the standard image plate 60 is installed in the area J of the screen 50. Then, the standard image on the standard image plate 60 is used as a reference to adjust the color of the corrected image on the area K of the screen 50. Consequently, even if the color of the screen 50 is different from white, the user can adjust the colors of the video signal in by operating the operating section 43 and executing a simple process.

Figure 8:
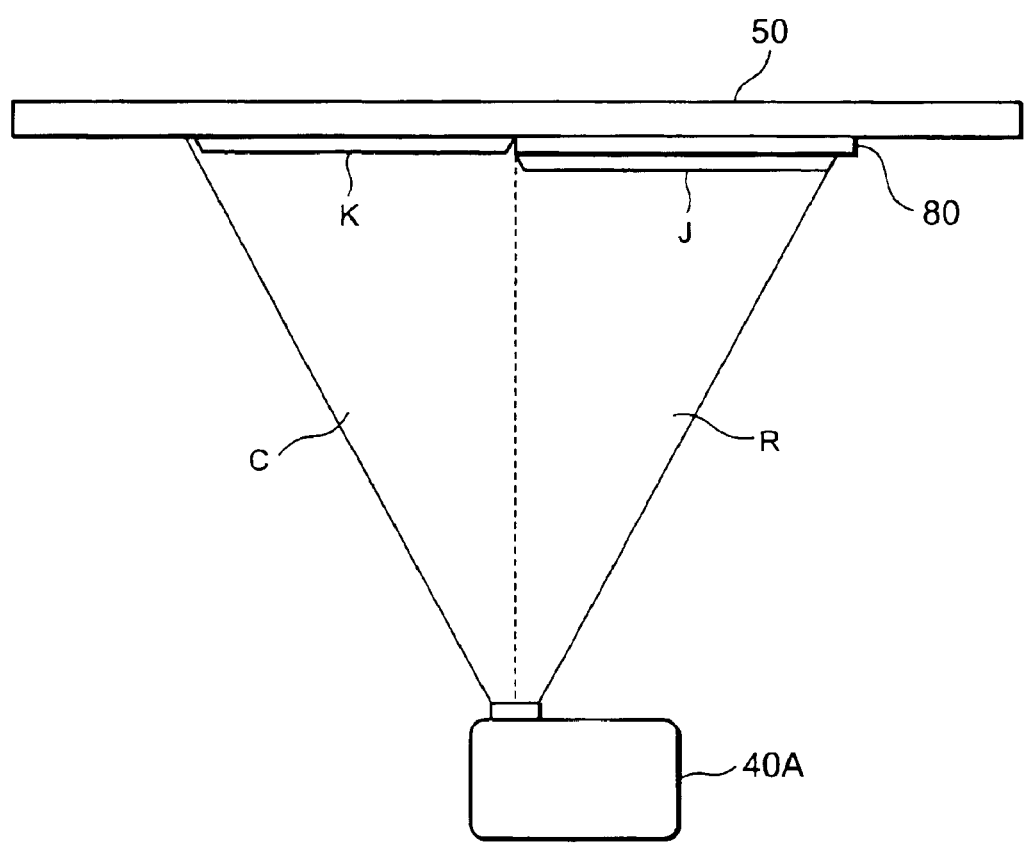
FIG. 8 is a schematic view showing a configuration of a second embodiment.

FIG. 8 is a schematic view showing a configuration of a second embodiment of the present invention. The same elements as those in FIG. 3, showing the first embodiment, are denoted by common reference numerals.

The second embodiment includes a projector 40A, the screen 50, and a standard white plate 80. The projector 40A projects an image corresponding to a given video signal, on the screen 50 but also projects separate images on two vertical or horizontal areas in the display area of the screen 50.

When the projector 40A projects a standard image on the standard white plate 80 through a standard image projecting area R, the standard image is displayed on the standard white plate 80 in the correct colors. The standard image contains all of, for example, white, red, green, blue, and a memory color (for example, flesh color, plant green, or sky blue). The projector 40A projects a corrected image in the area K of the screen 50 through a corrected image projecting area C, the corrected image having the same pattern as that of the standard image projected on the standard white plate 80. The user compares the standard image on the area J with the corrected image on the area K of the screen 50. Then, the user operates the operating section 43 so that the corrected image has the same hues as those of the standard image.

Figure 9:
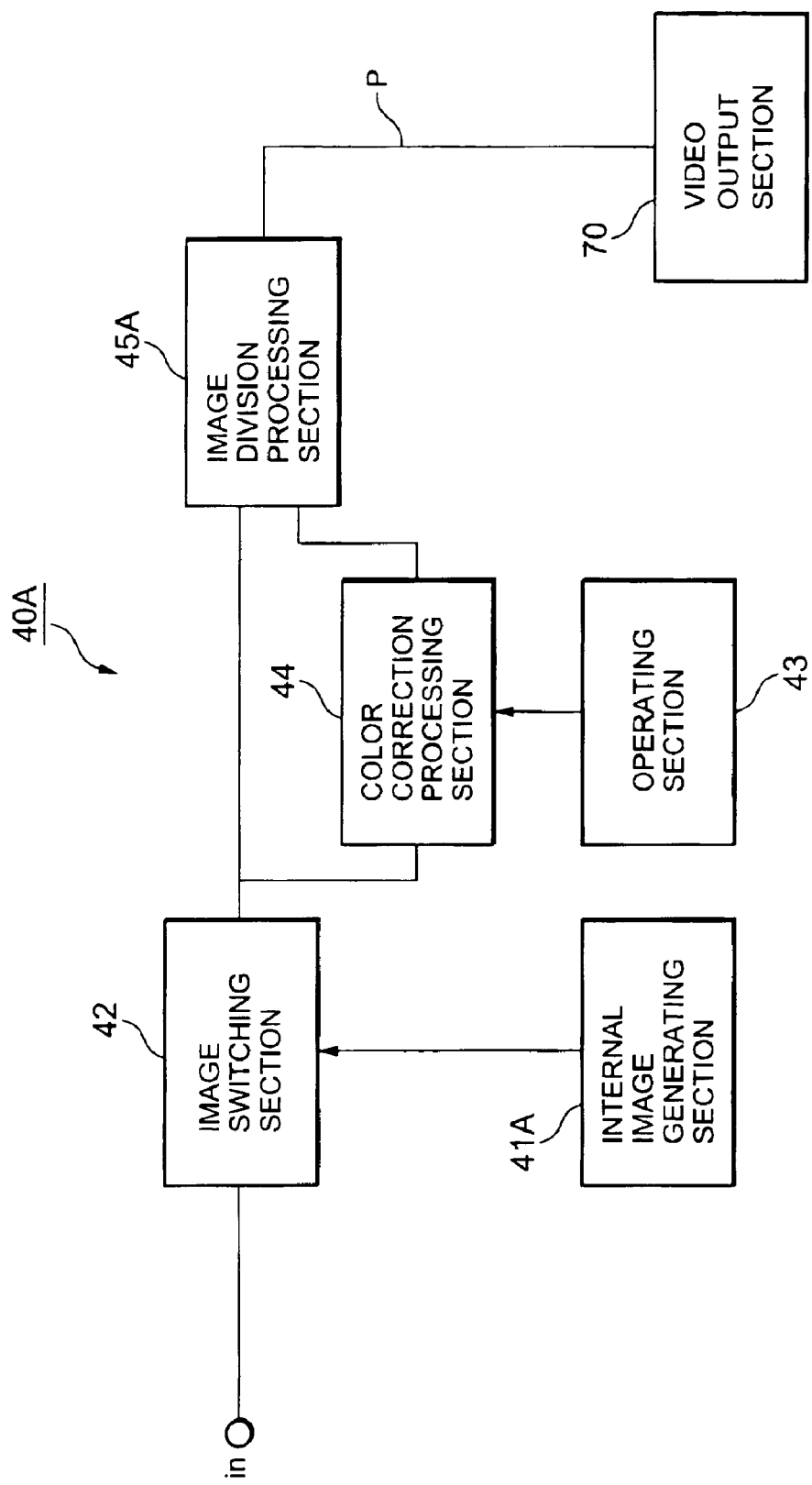
FIG. 9 is a block diagram showing a configuration of a projector according to the second embodiment of the present invention.

FIG. 9 is a block diagram showing a configuration of the projector 40A. The same elements as those in FIG. 4, showing the first embodiment, are denoted by common reference numerals.

Instead of the internal image generating section 41 and the screen division processing section 45, the projector 40A is provided with an internal image generating section 41A and a screen division processing section 45A having different configurations. The internal image generating section 41A holds, as internal images, a standard image to be projected on the standard white plate 80 as well as a corrected image to be projected on the area K of the screen 50. The image division processing section 45A adds correction data d to the image selected by the image switching section 42 to generate a color-adjusted corrected image and this video signal P. The video signal P is used to project the corrected image on the area K, while projecting the standard image on the area J.

Figure 10:
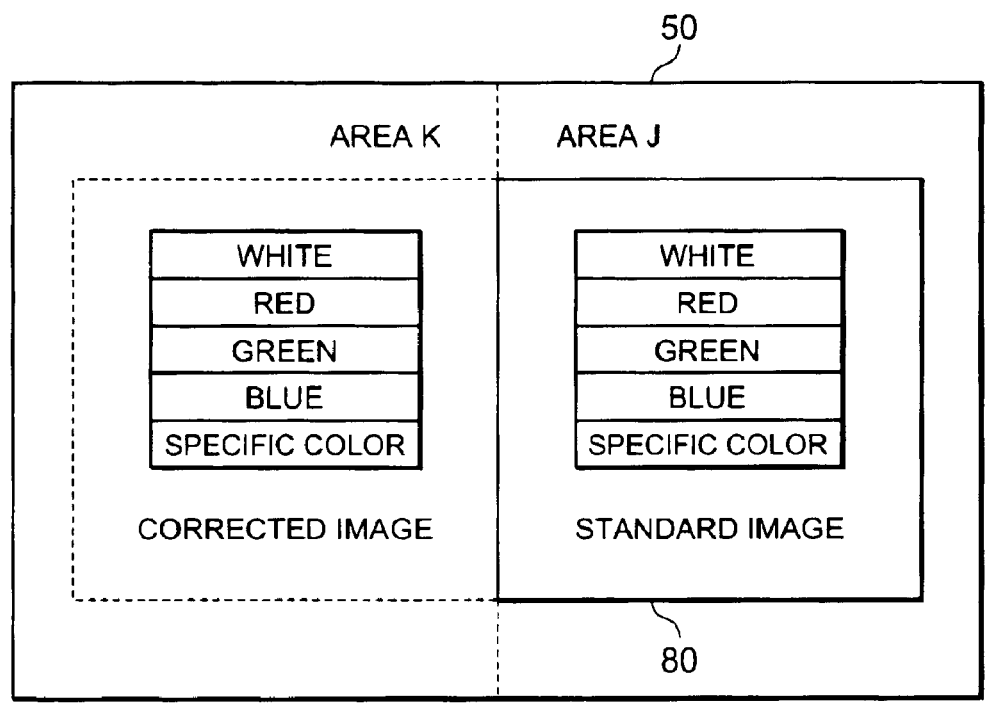
FIG. 10 is a view showing an example of a standard image on a standard white plate and a corrected image on the area K of the screen.
Figure 11:
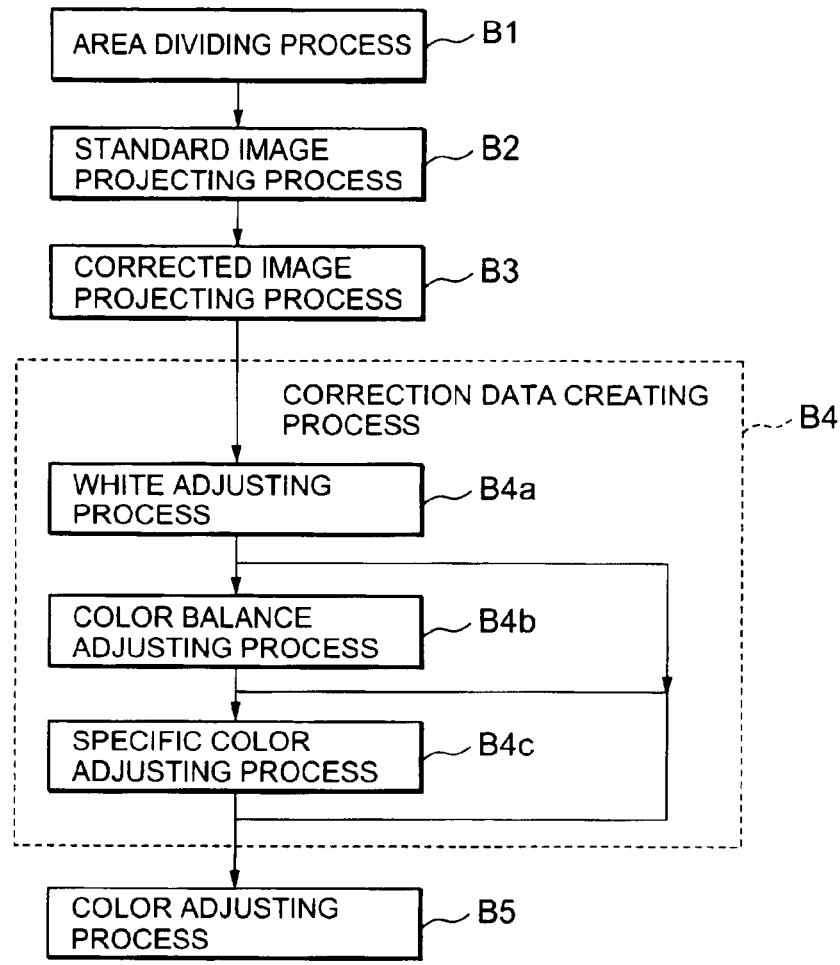
FIG. 11 is a flowchart illustrating a color adjusting method according to the second embodiment.

FIG. 10 is a view showing an example of a standard image on the standard white plate 80 and a corrected image on the area K of the screen 50. FIG. 11 is a flow chart illustrating a color adjusting method used for the projector 40A. With reference to FIGS. 10 and 11, description will be given of the contents of processing executed in the color adjusting method used in the present embodiment.

As shown in FIG. 10, the image division processing section 45 divides the display area of the screen 50 into two horizontally arranged areas J and K (step B1, area dividing process). The standard white plate 80 is installed on the area J of the screen 50. The video output section 70 projects a standard image on the standard white plate 80 (step B2, standard image projecting process). Further, the video output section 70 projects a corrected image on the area K of the screen 50, the corrected image having the same pattern as that of the standard image projected on the standard white plate 80 (step B3, corrected image projecting process).

The user compares the two images and operates the operating section 43 so that the corrected image on the area K is closer to the standard image on the standard white plate 80. In response to an input from the operating section 43, the color correction processing section 44 creates correction data d to correct the video signal in (step B4, corrected data creating process). This corrected data creating process (step B4) comprises at least one of a white adjusting process (step B4a), a color balance adjusting process (step B4b), and a specific color adjusting process (step B4c).

The white adjusting process (step B4a) comprises paying attention to white parts of the corrected and standard images to make adjustment so that the luminance of the white part of the corrected image is closer to that of the standard image. The color balance adjusting process (step B4b) comprises pay attention to the color balance of the entire corrected and standard images to make adjustment so that the color balance of the corrected image is closer to that of the standard image. In this case, at least one of the luminance, hue, and saturation of red, green, and blue in the corrected image is adjusted. The specific color adjusting process (step B4c) comprises paying attention to a specific color (for example, a memory color such as flesh color or sky blue) part of each of the corrected and standard images to make adjustment so that the color of the specific color part of the corrected image is closer to that of the standard image. The color correction processing section 44 adds the correction data d to the video signal in to adjust the colors of the corrected image displayed on the screen 50 (step B5, color adjusting process). Subsequently, the screen division processing section 45A clears the division of the display area of the screen 50. The video output section 70 displays, on the screen 50, an image obtained by adjusting the color of the video signal in.

As described above, in the second embodiment, the standard white plate 80 is installed in the area J of the screen 50. Then, the standard image on the standard white plate 80 is used as a reference to adjust the color of the corrected image on the area K of the screen 50. Consequently, even if the color of the screen 50 is different from white, the user can adjust the colors of the video signal in by operating the operating section 43 and executing a simple process.

FIGS. 12 to 17 are views illustrating a third embodiment of the present invention. The third embodiment will be described with reference to FIGS. 12 to 17 and FIGS. 9 and 11, described in the second embodiment.

Figure 12:
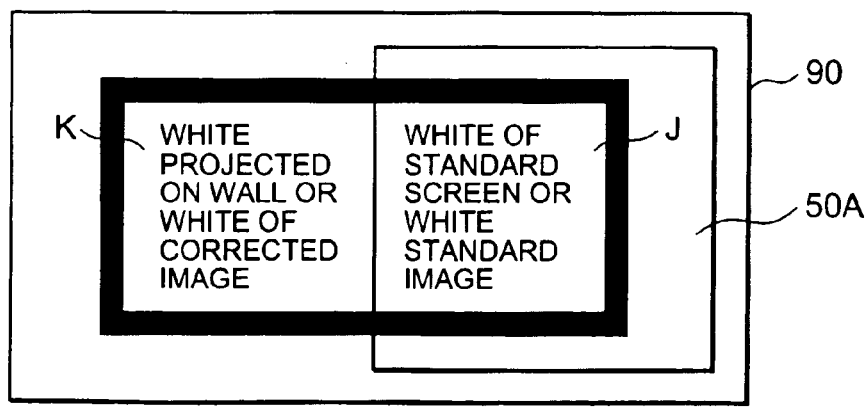
FIG. 12 is a view illustrating a color adjusting method according to a third embodiment.
Figure 13:
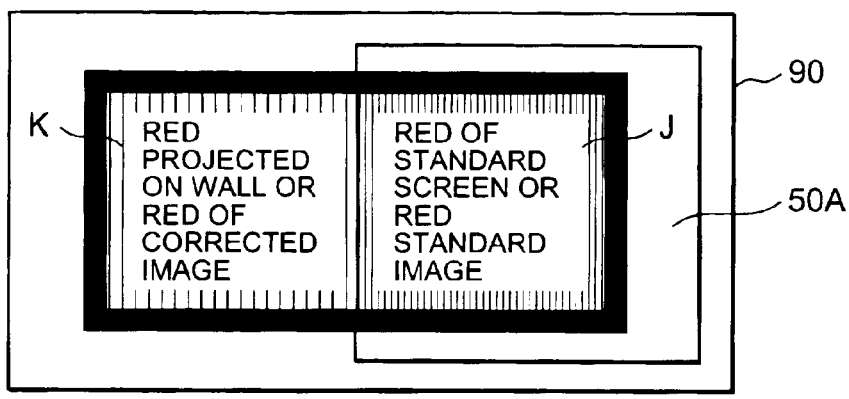
FIG. 13 is a view illustrating the color adjusting method according to the third embodiment.
Figure 14:
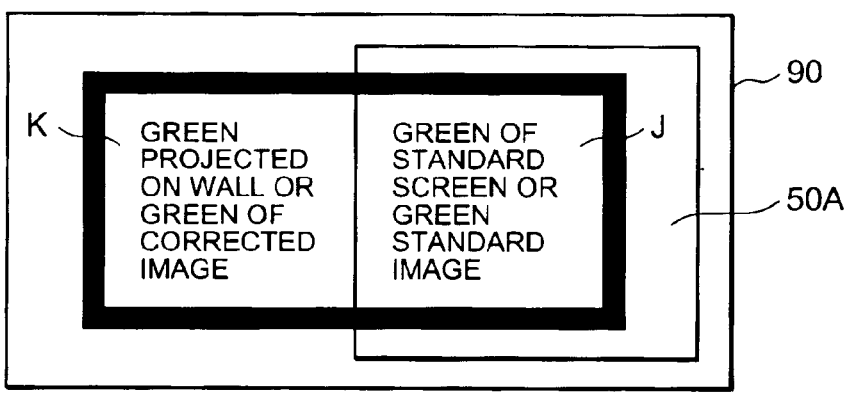
FIG. 14 is a view illustrating the color adjusting method according to the third embodiment.
Figure 15:
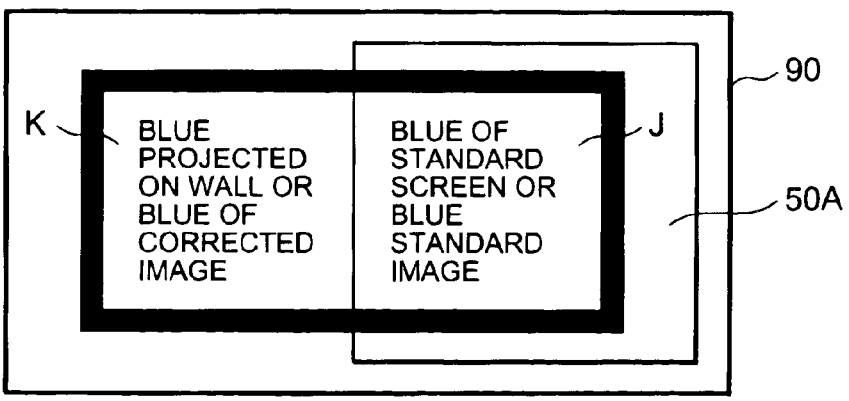
FIG. 15 is a view illustrating the color adjusting method according to the third embodiment.
Figure 16:
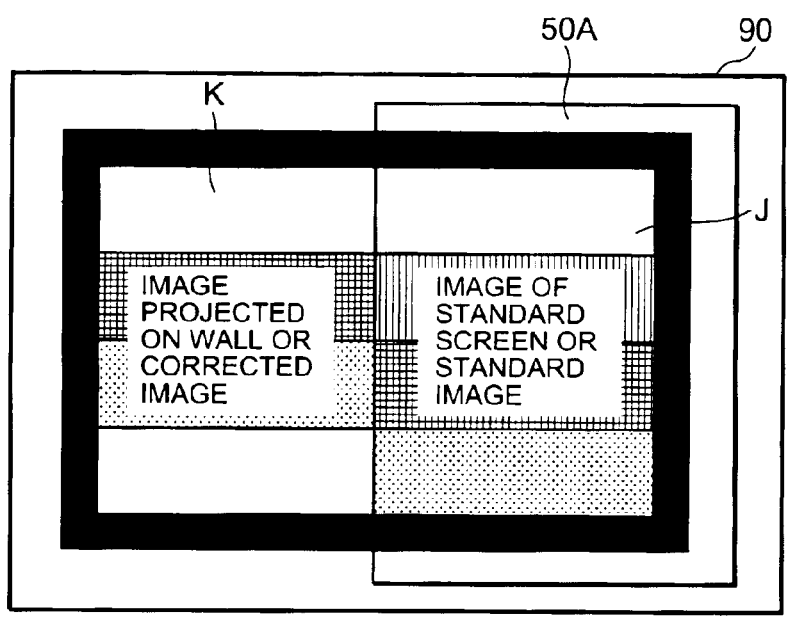
FIG. 16 is a view illustrating the color adjusting method according to the third embodiment.

As shown in FIG. 12, the image division processing section 45 divides a display area on a wall 90 into two horizontally arranged areas J and K (step B1, area dividing process). A standard white screen 50A is installed on the area J of the wall 90. The video output section 70 projects a standard image on the screen 50A (step B2, standard image projecting process) Further, the video output section 70 projects a corrected image on the area K of the wall 90, the corrected image having the same pattern as that of the standard image projected on the screen 50A (step B3, corrected image projecting process).

The user compares the two images and operates the operating section 43 so that the corrected image on the area K is closer to the standard image on the screen 50A. In response to an input from the operating section 43, the color correction processing section 44 creates correction data d to correct the video signal in (step B4, corrected data creating process). This corrected data creating process (step B4) comprises at least one of the white adjusting process (step B4a), the color balance adjusting process (step B4b), and the specific color adjusting process (step B4c).

Figure 17:
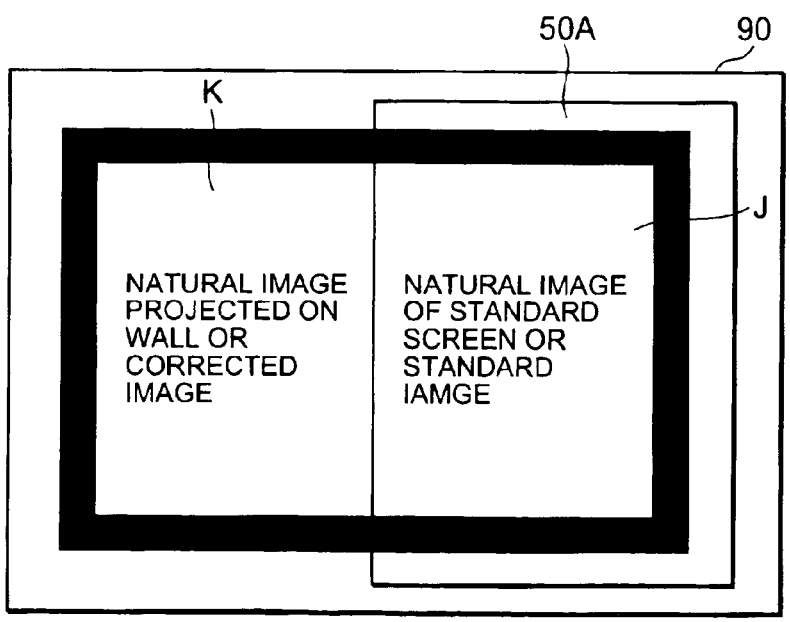
FIG. 17 is a view illustrating the color adjusting method according to the third embodiment.

The white adjusting process (step B4a) comprises paying attention to white parts of the corrected and standard images to make adjustment so that the luminance of the white part of the corrected image is closer to that of the standard image as shown in FIG. 12. The color balance adjusting process (step B4b) comprises pay attention to the color balance of the entire corrected and standard images to make adjustment so that the color balance of the corrected image is closer to that of the standard image as shown in FIGS. 13 to 16. In this case, at least one of the luminance, hue, and saturation of red, green, and blue in the corrected image is adjusted. The specific color adjusting process (step B4c) comprises paying attention to a specific color (for example, a memory color such as flesh color or sky blue) part of each of the corrected and standard images to make adjustment so that the color of the specific color part of the corrected image is closer to that of the standard image as shown in FIG. 17. The color correction processing section 44 adds the correction data d to the video signal in to adjust the colors of the corrected image displayed on the wall 90 (step B5, color adjusting process). Subsequently, the screen division processing section 45 clears the division of the display area of the wall 90. The video output section 70 displays, on the wall 90, an image obtained by adjusting the color of the video signal in.

In this manner, the third embodiment gives advantages similar to those of the second embodiment.

Figure 18:
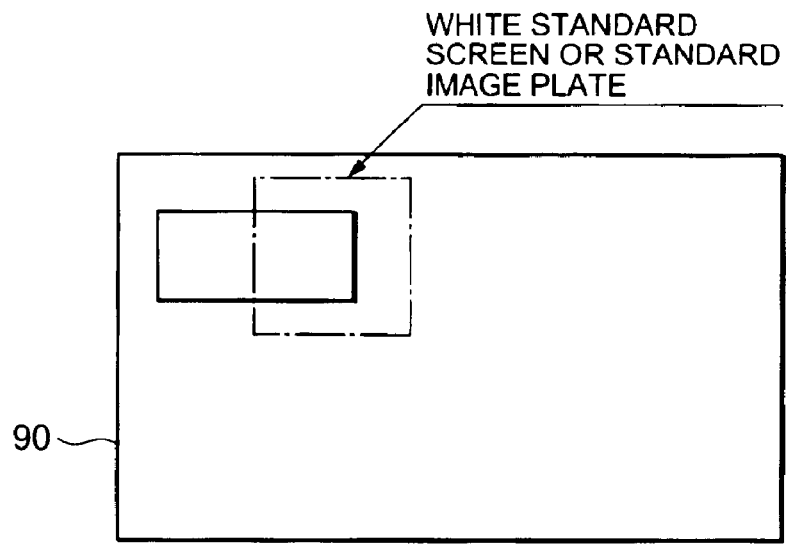
FIG. 18 is a view showing a variation of the two areas.
Figure 19:
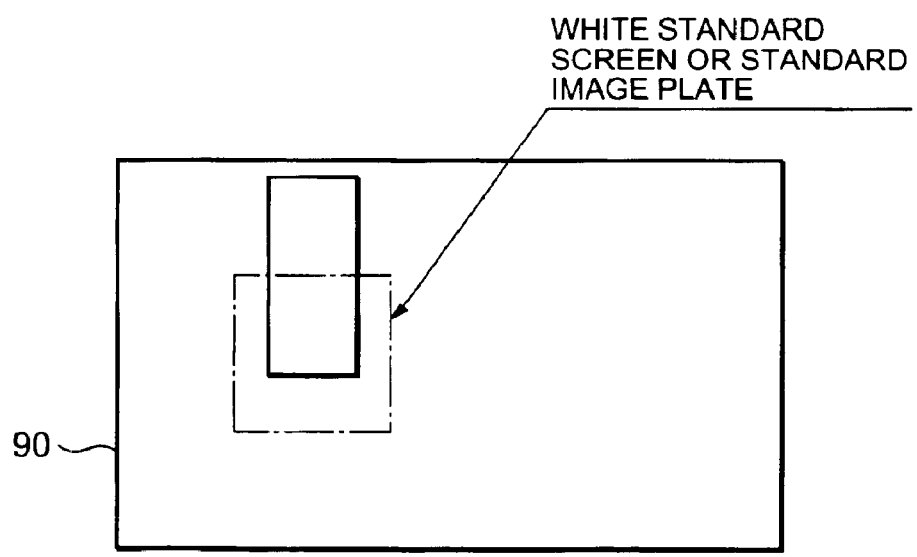
FIG. 19 is a view showing a variation of the two areas.

In FIGS. 6 and 10, the display area of the screen 50 is divided into the two horizontally arranged areas. However, the display area may be divided into two vertically arranged areas. Alternatively, the positions of the standard and the corrected images may be reversed. The positions and sizes of these two areas are arbitrary provided that the corrected image can be compared with the standard image. For example, only part of the display area maybe used as shown in FIGS. 18 and 19. Further, the white adjusting process (step A4a), color balance adjusting process (step A4b), and specific color adjusting process (step A4c) in FIG. 7 may be executed in an arbitrary order. Alternatively, only arbitrary one or two of these processes may be executed.

In place of the three-plate type liquid crystal projector unit, the video output section 70 in FIG. 4 may be, for example, a single-plate type projector unit or a DLP (Digital Light Processing) projector. The DLP is a projection type video display method developed by Texas Instruments Incorporated, U.S. With the DLP, by controlling the directions of several million mirrors constituting an element and each having a size of 13×13 $\mu$m, light from a light source is reflected to project a video on the screen.

In the second embodiment, in the correction data creating process (step B4), the correction data d is such that the corrected image is closer to the standard image. However, the correction data d may be such that the standard image is closer to the corrected image. When adjustment is made so that the standard image is closer to the corrected image, the color of the screen 50 can be determined. Thus, on the basis of this information, the corrected image is adjusted in accordance with the color of the screen 50.

In each of the embodiments, a plurality of images corrected using color correction parameters (at least one of the luminance, hue, and saturation of red, green, and blue) may be provided so that the colors of the right and left images can be matched with each other by selecting a proper image.

In the third embodiment, the standard white screen 50A is installed on the area J of the wall 90. However, in place of the screen 50A, the standard image plate 60 in FIG. 3 may be installed, and a color adjusting method similar to that in the first embodiment may be carried out. Further, in the correction data creating process in FIG. 4 (step A4) and the correction data creating process in FIG. 11 (step B4), color adjusting scroll bars corresponding to the respective colors may be displayed and used to adjust the luminance, hue, or saturation. Alternatively, in these correction data creating processes (steps A4 and B4), color adjusting color palettes corresponding to the respective colors may be displayed so that a proper color can be selected from the color palette for color adjustment.

In each embodiment, a plurality of colors may be assumed for the screen 50, and a plurality of correction data may be created which correspond to the respective colors. Then, in the correction data creating process (steps A4 and B4), a color closest to the current one of the screen 50 may be selected. Then, the correction data corresponding to the selected color may be used. The color may be selected by using a scroll bar displayed to select the luminance, hue, or saturation or displaying a color palette and selecting a proper color from this color palette.

As described above, according to the configuration of the present invention, it is possible to use a simple process to adjust the colors of a video signal so as to display it in the optimum colors on a screen or wall the color of which is different from white.

While the present invention has been described in connection with certain preferred embodiments, it is to be understood that the subject matter encompassed by the present invention is not limited to those embodiments. On the contrary, it is intended to include all alternatives, modifications, and equivalents as can be included within the spirit and scope of the following claims.

What is claimed is:

1. A color adjusting method used for a projector to correct colors of an image on a projecting surface, the image being projected by the projector, the method comprising the steps of:
   placing a standard image plate in a first area of said projecting surface;
   projecting white light on the standard image plate;
   projecting an image on a second area of the projecting surface; and
   correcting colors of the image in said second area so that the colors are closer to colors of said standard image plate.

2. The color adjusting method for a projector according to claim 1, wherein a standard image is drawn on said standard image plate and is displayed in correct colors when white light is projected on said standard image plate.

3. The color adjusting method for a projector according to claim 2, wherein said standard image contains white, red, green, blue, and a memory color.

4. The color adjusting method for a projector according to claim 2, wherein said correction includes at least one of the following processes:
   (a) a white adjusting process of making adjustment so that a white part of an image in said second area is closer to a white part of said standard image;
   (b) a color balance adjusting process of making adjustment so that a color balance of the image in said second area is closer to a color balance of said standard image; and
   (c) a specific color adjusting process of making adjustment so that a specific color part of the image in said second area is closer to a specific color part of said standard image.

5. A color adjusting method used for a projector to correct colors of an image on a projecting surface, the image being projected by the projector, the method comprising the steps of:
   placing a white plate in a first area of said projecting surface;
   projecting a standard image on said white plate;
   projecting an image on a second area of said projecting surface; and
   correcting colors of the image in said second area so that the colors are closer to colors of said standard image.

6. The color adjusting method for a projector according to claim 5, wherein said white plate is displayed in correct colors when said standard image is projected on said white plate.

7. The color adjusting method for a projector according to claim 5, wherein said standard image contains white, red, green, blue, and a memory color.

8. The color adjusting method for a projector according to claim 5, wherein said correction includes at least one of the following processes:
   (a) a white adjusting process of making adjustment so that a white part of an image in said second area is closer to a white part of said standard image;
   (b) a color balance adjusting process of making adjustment so that a color balance of the image in said second area is closer to a color balance of said standard image; and
   (c) a specific color adjusting process of making adjustment so that a specific color part of the image in said second area is closer to a specific color part of said standard image.

9. A color adjusting method used for a projector to correct colors of an image on a projecting surface, the image being projected by the projector, the method comprising the steps of:
   placing a white plate in a first area of said projecting surface;
   projecting a standard image on said white plate;
   projecting an image on a second area of said projecting surface;
   correcting colors of said standard image so that the colors are closer to colors of the image in said second area; and
   correcting the colors of the image in said second area on the basis of information on the correction of said standard image.

10. The color adjusting method for a projector according to claim 9, wherein said white plate is displayed in correct colors when said standard image is projected on said white plate.

11. The color adjusting method for a projector according to claim 9, wherein said standard image contains white, red, green, blue, and a memory color.

12. The color adjusting method for a projector according to claim 9, wherein said correction includes at least one of the following processes:
   (a) a white adjusting process of making adjustment so that a white part of said standard image is closer to a white part of an image in said second area;
   (b) a color balance adjusting process of making adjustment so that a color balance of said standard image is closer to a color balance of the image in said second area; and
   (c) a specific color adjusting process of making adjustment so that a specific color part of said standard image is closer to a specific color part of the image in said second area.

13. A projector that projects an image on a projecting surface, the projector comprising:
   an image dividing section that forms a first area and a second area in an image to be projected;
   a video output section that projects, as an image for the first area, white light on a standard image plate on which a standard image has been drawn, while projecting an image for the second area on the projecting surface;
   an operating section operated by a user; and
   a color correcting section that corrects the image in said second area on the basis of information inputted to said operating section.

14. The projector according to claim 13, wherein said color correcting section includes at least one of the following means:
   white adjusting means for making adjustment so that a white part of an image in said second area is closer to a white part of said standard image, color adjusting means for making adjustment so that a color balance of the image in said second area is closer to a color balance of said standard image, and specific color balance adjusting means for making adjustment so that a specific color part of the image in said second area is closer to a specific color part of said standard image.

15. A projector that projects an image on a projecting surface, the projector comprising:
   an image dividing section that forms a first area and a second area in an image to be projected;

a video output section that projects a standard image on a white plate as an image for said first area, while projecting an image for said second area on said projecting surface;

an operating section operated by a user; and a color correcting section that corrects the image in said second area on the basis of information inputted to said operating section.

16. The projector according to claim 15, wherein said color correcting section includes at least one of the following means:

white adjusting means for making adjustment so that a white part of an image in said second area is closer to a white part of said standard image, color balance adjusting means for making adjustment so that a color balance of the image in said second area is closer to a color balance of said standard image, and specific color adjusting means for making adjustment so that a specific color part of the image in said second area is closer to a specific color part of said standard image.

17. A projector that projects an image on a projecting surface, the projector comprising:

an image dividing section that forms a first area and a second area in an image to be projected;

a video output section that projects a standard image on a white plate as an image for said first area, while projecting an image for said second area on said projecting surface;

an operating section operated by a user; and a color correcting section that corrects said standard image on the basis of information inputted to said operating section and that corrects the image in said second area on the basis of information on the correction of said standard image.

18. The projector according to claim 17, wherein said color correcting section includes at least one of the following means:

white adjusting means for making adjustment so that a white part of said standard image is closer to a white part of an image in said second area, color balance adjusting means for making adjustment so that a color balance of said standard image is closer to a color balance of the image in said second area, and specific color adjusting means for making adjustment so that a specific color part of said standard image is closer to a specific color part of the image in said second area.

* * * * *